United States Patent [19]

Stromberg

[11] Patent Number: 4,522,430
[45] Date of Patent: Jun. 11, 1985

[54] QUICK CONNECT COUPLER

[75] Inventor: James L. Stromberg, Duncan, Okla.

[73] Assignee: Halliburton Company, Duncan, Okla.

[21] Appl. No.: 296,325

[22] Filed: Aug. 26, 1981

Related U.S. Application Data

[63] Continuation-in-part of Ser. No. 238,802, Feb. 27, 1981, abandoned.

[51] Int. Cl.³ .............................................. F16L 35/00
[52] U.S. Cl. ......................................... 285/24; 285/39; 285/87; 285/310; 285/315; 285/323; 285/348; 285/349
[58] Field of Search ................... 285/24, 27, 309, 310, 285/311, 312, 315, 316, 320, 322, 323, 82, 348, 87, 349, 88, 39

[56] References Cited

U.S. PATENT DOCUMENTS

| | | |
|---|---|---|
| 1,662,311 | 3/1928 | Hamer . |
| 1,822,444 | 9/1931 | MacClatchie . |
| 1,866,726 | 7/1932 | Santiago . |
| 1,875,266 | 8/1932 | Santiago . |
| 2,196,652 | 4/1940 | Baker . |
| 2,509,118 | 5/1950 | Warren .......................... 285/349 X |
| 2,951,274 | 9/1960 | Elsner ............................. 285/315 X |
| 3,096,999 | 7/1963 | Ahlstone et al. ............... 285/315 X |
| 3,339,947 | 9/1967 | Maisey ............................ 285/320 X |
| 3,436,085 | 4/1969 | Polk ................................. 285/349 X |
| 3,545,542 | 11/1970 | Scott . |
| 3,616,850 | 11/1971 | Scott . |
| 3,628,812 | 12/1971 | Larralde ........................ 285/315 X |
| 3,863,716 | 2/1975 | Streich . |
| 4,138,144 | 2/1979 | Pierce ............................ 285/315 X |
| 4,153,278 | 5/1979 | Ahlstone ........................ 285/315 X |
| 4,209,193 | 6/1980 | Ahlstone . |
| 4,209,270 | 6/1980 | Billingsley . |
| 4,246,967 | 1/1981 | Harris . |

FOREIGN PATENT DOCUMENTS 1314816  4/1973  United Kingdom ................ 285/315

OTHER PUBLICATIONS

Description of Prior Art Plug Container at p. 3138 of *Halliburton Sales & Service Catalog*–No. 39.

*Primary Examiner*—Dave W. Arola
*Attorney, Agent, or Firm*—L. Wayne Beavers; James R. Duzan; Thomas R. Weaver

[57] ABSTRACT

Apparatus and methods are provided for coupling a body member to a cylindrical member having a radially outward extending shoulder thereon. A coupling includes the body member and an annular seal for sealing between the body member and the cylindrical member. A plurality of collet sections are disposed around the body member, each of the collet sections having an upper end connected to the body member and having a lower end adapted for engagement with a lower end surface of the shoulder of the cylindrical member. An outer sleeve is slidably disposed about the plurality of collet sections and is slidable relative to the collet sections between an open position wherein the lower ends of the collet sections may receive the shoulder of the cylindrical member therebetween, and a closed position wherein the body member is sealingly coupled to the cylindrical member.

20 Claims, 11 Drawing Figures

QUICK CONNECT COUPLER

This application is a continuation-in-part of my prior U.S. patent application Ser. No. 238,802 filed Feb. 27, 1981 and now abandoned.

This invention relates generally to couplings constructed to be quickly connected to a cylindrical member, and more particularly, but not by way of limitation, to a coupling for quickly connecting a plug container to a casing of an oil or gas well.

One operation which is often conducted during the completion of an oil or gas well is a cementing operation wherein fluid cement is pumped down the central bore of a well casing and out through ports in the side of the well casing into an annulus between the well casing and the oil well borehole where the cement is allowed to harden to provide a seal between the well casing and the well borehole.

At the beginning of a typical cementing job, in rotary drilled wells, the well casing and the well borehole are usually filled with drilling mud. To reduce contamination at the interface between the drilling mud and the cement which is pumped into the well casing on top of the drilling mud, a bottom cementing plug is pumped ahead of the cement slurry so that the interface between the cement slurry and the drilling mud already in the well casing is defined by the bottom cementing plug.

As the cement is pumped into the well casing, the bottom cementing plug is pumped down the well casing and this plug also serves the function of wiping mud from the walls of the casing ahead of the cement slurry thereby reducing dilution of the cement slurry. When this bottom cementing plug reaches a float collar located in a lower portion of the well casing, the bottom cementing plug catches in the float collar and the differential pressure due to the high pressure cement located above the bottom cementing plug ruptures a diaphragm of the bottom cementing plug thereby allowing the cement slurry to proceed down through the plug and then through the appropriate ports into the annulus between the well casing and the borehole.

At the completion of the mixing of the cement slurry, a top cementing plug is pumped into the well casing similarly defining an interface between the upper level of the cement slurry within the well casing and drilling mud which is pumped in on top of the cement slurry.

This top cementing plug is solid and when it lands in the float collar the dislacement of cement is terminated.

Sometimes it is desirable to be able to place the cementing plugs in the well casing without opening the well casing. In such a situation, a plug container is mounted on top of the well casing. This plug container holds the cementing plugs and includes a mechanical retaining means which keeps the plugs from falling into the well casing until the desired time.

A typical prior art plug container is shown in FIG. 1 of page 3138 of *Halliburton Services Sales & Service Catalog-Number* 39, and that plug container is described at page 3138 of that publication. This prior art plug container includes a threaded male lower end as seen in FIG. 1 on page 3138 of the cited publication, which threaded lower end is attached to the well casing by threading that lower end into a casing collar.

Several problems have been encountered utilizing this prior art threaded connection between the plug container and the casing collar. Often, the top of the casing stands as much as forty five feet above the floor of the drilling rig thus creating a hazard to personnel who attempt to work at that height to perform the threading operation. This is apparent when one considers that the plug container is a relatively heavy piece of equipment which is typically handled with chain tongs. In addition, the prior art device is susceptible to cross-threading when threaded to the casing collar. This prior art design is also sometimes susceptible to blowouts under high pressure conditions.

The present invention provides a coupling for quickly connecting a plug container to a casing collar attached to the upper end of the well casing. More generally, the invention includes apparatus and methods for quickly connecting a body member to a cylindrical member having a radially outward protruding shoulder. The coupling of the present invention is safer to use, safer to install and easier to install than the prior art device.

The coupling of the present invention includes a body member to be coupled to the wall casing. An annular seal means is provided for sealing between the body member and the casing collar. A plurality of collet sections are disposed around the body member, and each of the collet sections includes an upper end connected to the body member and a lower end adapted for engagement with a lower end surface of the casing collar. An outer sleeve is slidably disposed about the plurality of collet sections and is slidable relative to the collet sections between an open position wherein the lower ends of the collet sections may receive the casing collar therebetween, and a closed position wherein the body member is sealingly coupled to the casing collar.

Numerous objects, features and advantages of the present invention will be readily apparent to those skilled in the art upon a review of the following disclosure when taken in conjunction with the accompanying drawings.

Figure 1:
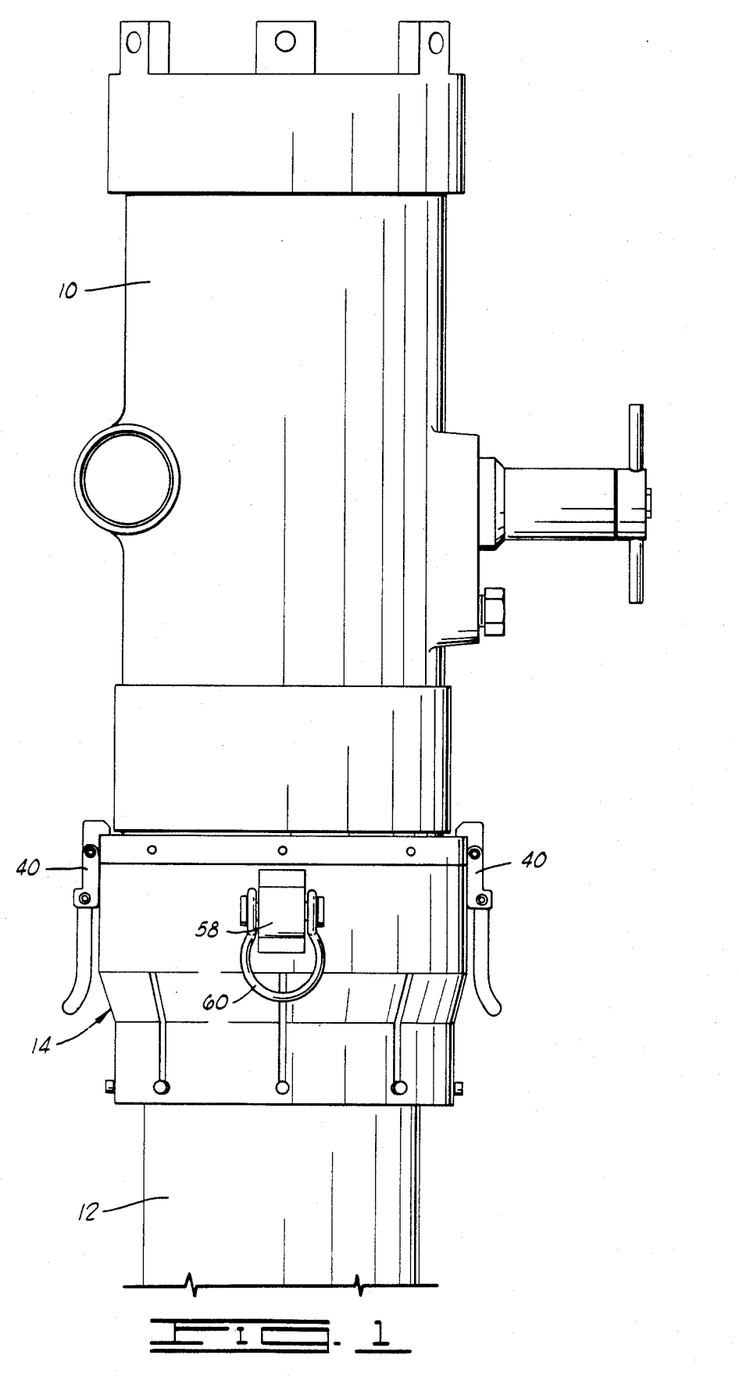
FIG. 1 is an elevation view of a plug container coupled to a well casing by the coupling of the present invention.

Referring now to the drawings and particularly to FIG. 1 a plug container 10 is thereshown attached to a well casing 12 by the coupling 14 of the present invention.

Referring now to FIGS. 2–5, a series of sequential drawings there illustrates the manner in which the coupling 14 is connected to the well casing 12.

Figure 2:
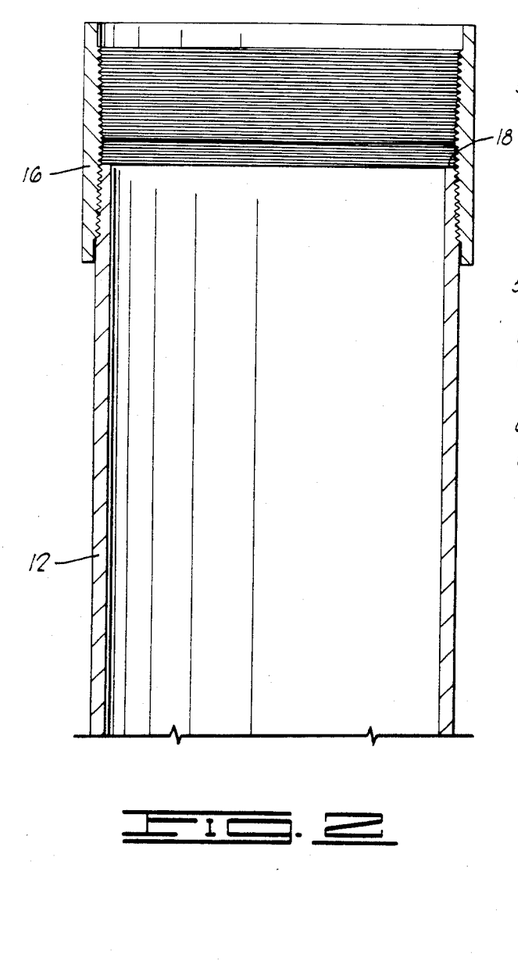
FIG. 2 is a section elevation view of the upper end of a well casing with a casing collar attached thereto.

FIG. 2 is a section elevation view of the well casing 12 with a threaded casing collar 16 attached to an upper end 18 of well casing 12. The casing 12 may be said to include the casing collar 16.

Figure 3:
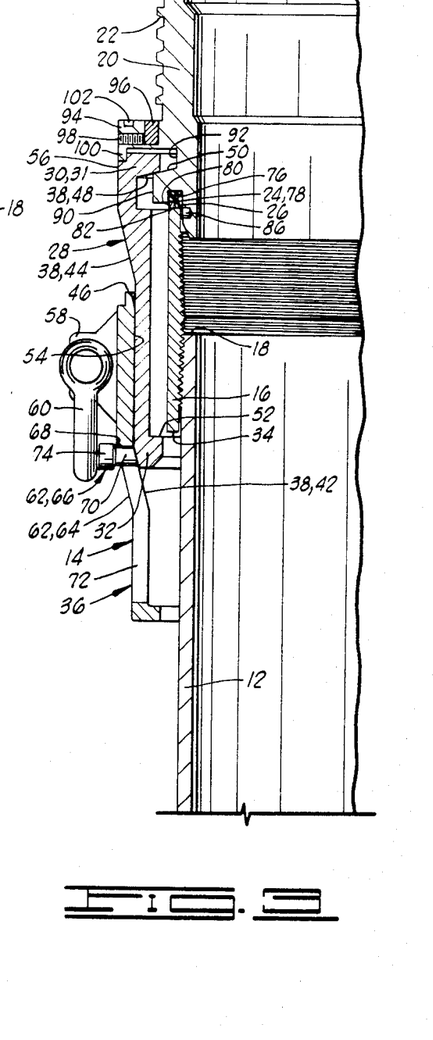
FIG. 3 is a half-section elevation view of the coupling of the present invention in its open position set on top of the casing collar.
Figure 4:
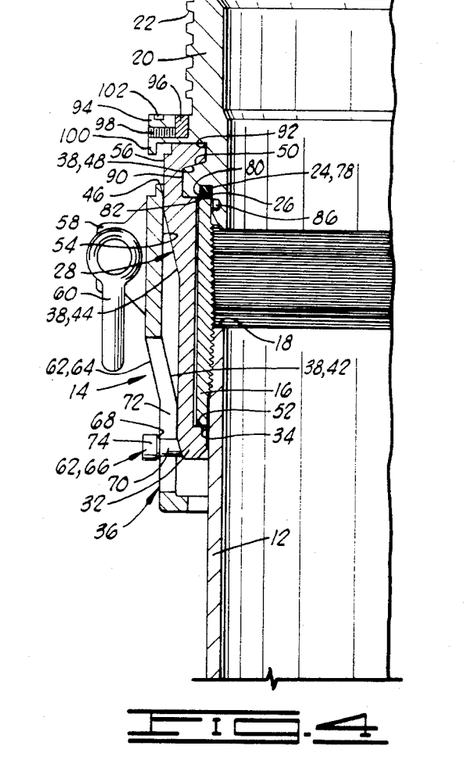
FIG. 4 is a view similar to FIG. 3 with the outer sleeve moved partially upward relative to the collet sections from the lower position of the outer sleeve, so that the collet sections have coupled the body member to the casing collar and have compressed the sealing ring between the body member and the upper end of the casing collar.
Figure 5:
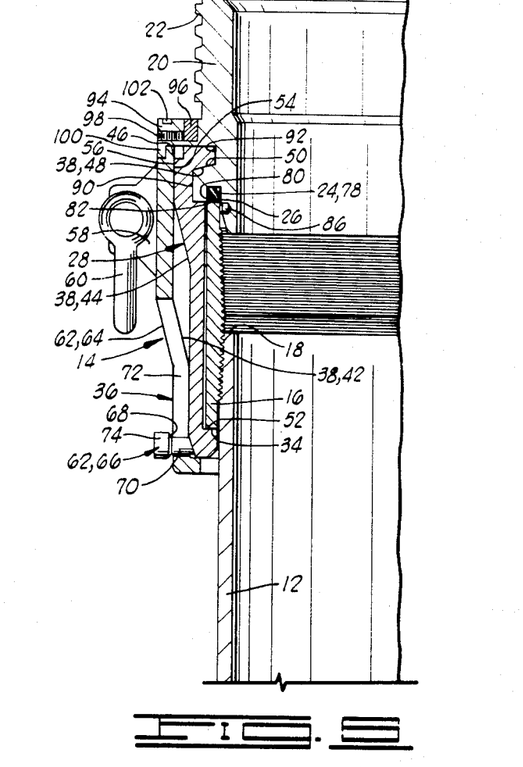
FIG. 5 is a view similar to FIG. 4 with the outer sleeve moved further upward to its uppermost closed or locked position wherein the collet sections are locked in place by the outer sleeve.

FIG. 3 is a half-section elvation view of the coupling 14 in its open position and set in place on top of the casing collar 16. The coupling 14 includes a body member 20 which, in the ilustrated embodiment, is a lower portion of the plug container 10. Body member 20 includes outer threads 22 which threadedly connect to the remainder of the plug container 10. In actual practice the entire plug container 10 is assembled with coupling 14 prior to placing coupling 14 over casing collar 16. In FIGS. 3–5 the upper portion of plug container 10 has been eliminated merely to simplify the drawings.

The coupling 14 further includes an annular seal means 24 for sealing between body member 20 and an upper end surface 26 of casing collar 16.

As will be appreciated from a reading of the following description of the manner of operation of the coupling 14, the coupling 14 is not necessarily utilized in a vertical position, and could be utilized in any situation where it is desired to connect a body member to a cylindrical member having a radially outward extending shoulder thereon.

For purposes of generally defining the structure of the invention, the casing 12 may be referred to as a cylindrical member which includes a radially outward extending shoulder defined by the casing collar 16. Descriptions of radially inward and outward extending structure refer to radially inward and outward as defined from the longitudinal axis of the casing 12. To refer to dimensions and directions parallel to the longitudinal axis of the casing 12, the reference to longitudinally outward directions refers to directions parallel to the longitudinal axis of the casing 12 and directed away from the casing 12, so that in FIG. 3 a reference to a longitudinally outward facing surface would be the equivalent to a reference to an upward facing surface. Similarly, longitudinally inward refers to a downward facing surface or a downward direction. The remainder of this disclosure will refer generally to upward and downward directions for ease of description, but it is understood that the terms "longitudinally outward" and "longitudinally inward" may be substituted for the terms "upward" and "downward".

Disposed about the body member 20 are a plurality of collet sections 28. In the illustrated embodiments there are eight collet sections 28 equally spaced about the body member 20. Each of the collet sections 28 includes an upper first end 30 connected to the body member 20 and a lower second end 32 adapted for engagement with a downward facing surface 34 of casing collar 16.

Slidably disposed about the plurality of collet sections 28 is an outer sleeve 36 which is slidable relative to the collet sections 28 between an open position shown in FIG. 3, wherein the lower ends 32 of collet sections 28 may receive casing collar 16 therebetween, and a closed position illustrated in FIG. 5 wherein the casing collar 16 and body member 20 are sealingly coupled together.

The coupling 14 further comprises an actuating means 38, operably associated with the plurality of collet sections 28 and the outer sleeve 36, for moving the lower ends 32 of collet sections 28 into engagement with the lower end 34 of casing collar 16 thereby coupling body member 20 to casing collar 16 upon sliding of said outer sleeve 36 from its open position toward its closed position.

Actuating means 38 further provides a means for moving body member 20 downward toward casing 12 and casing collar 16 thereby compressing seal means 24 between body member 20 and the upper end 26 of casing collar 16 to provide a pressure seal therebetween upon sliding of the outer sleeve 36 from its open position toward its closed position.

Actuating means 38 further provides a means for locking collet sections 28 in position after body member 20 and casing collar 16 are sealingly coupled together, upon sliding of outer sleeve 36 to its closed position shown in FIG. 5.

As illustrated in FIG. 1, the coupling 14 includes a pair of opposed latch means 40 for latching outer sleeve 36 to body member 20 when sleeve 36 is in its closed position as shown in FIG. 5, to hold sleeve 36 in its closed position.

The actuating means 38 is comprised of a plurality of surfaces defined on body member 20, collet sections 28, and outer sleeve 36, which surfaces interact with each other to provide the necessary movement of collect sections 28 and body member 20 upon sliding motion of outer sleeve 36 from its lowermost open position shown in FIG. 3 to its uppermost closed position shown in FIG. 5.

Actuating means 38 includes a radially inner downwardly tapered first cam surface 42 on sleeve 36 which is so arranged and constructed relative to the collet sections 28 that upon upward movement of sleeve 36 from the position shown in FIG. 3, the first cam surface 42 engages the lower ends of collet sections 28, and cams said lower ends 32 of collet sections 28 radially inward toward well casing 12. First cam surface 42 may also be referred to as sleeve cam surface 42.

Actuating means 38 further includes a plurality of radially outer downwardly tapered second cam surfaces 44, one of said second cam surfaces 44 being on each of said collet sections 28. The second cam surfaces 44 are so arranged and constructed relative to outer sleeve 36 that upon upward motion of outer sleeve 36 from its lowermost open position shown in FIG. 3, the second cam surfaces 44 of collet sections 28 are engaged by an upper end 46 of outer sleeve 36 and this cams the upper ends 30 of collet sections 28 radially inward toward body member 20. Second cam surfaces 44 may be referred to as collet cam surfaces 44.

Actuating means 38 further includes a plurality of radially inner upwardly tapered third cam surfaces 48, one of said third cam surfaces 48 being located on a radially inward extending lug 31 of each of said upper ends 30 of collet sections 28. Each of the third cam surfaces 48 engages a radially outer upwardly tapered coupling surface 50 of body member 20. The third cam surfaces 48 are so arranged and constructed relative to body member 20 and sleeve 36 that upon radially inward movement of upper ends 30 of collet sections 28 into engagement with coupling surface 50 due to upward movement of sleeve 36 from its open position shown in FIG. 3, the collet sections 28 are first cammed upward relative to casing collar 16 until an upward facing surface 52 of lower ends 32 of collet sections 28 engages lower end 34 of casing collar 16, and then body member 20 is cammed downward towards casing collar 16 thereby compressing seal means 24. Third cam surfaces 48 may be referred to as lug cam surfaces 48.

FIG. 4 illustrates an intermediate position of outer sleeve 36 between its open position of FIG. 3 and its closed position of FIG. 5. In FIG. 4, a radially inner cylindrical locking surface 54 of sleeve 36 is just moving into engagement with a lower end of radially outer arcuate surfaces 56 of first ends 30 of collet sections 28 so that arcuate surfaces 56 are closely received within locking surface 54. At the point during the assembly operation illustrated in FIG. 4, the coupling and sealing motions of the collet sections 28 have been completed since there is no further movement of the collet sections 28 or of the body member 20 relative to casing collar 16.

Further upward movement of sleeve 36 from the position in FIG. 4 to its uppermost position of FIG. 5 causes the arcuate surfaces 56 of collet sections 28 to be closely received within locking surfaces 54 so that collet sections 28 are locked in position.

Referring again to FIG. 1, the latch means 40 are utilized to latch outer sleeve 36 in its uppermost position and hold it in that uppermost position until it is desired to uncouple coupling 14 from casing collar 16.

Also seen in FIGS. 1 and 3-5 are a hammer lug 58 with a chain shackle 60 attached thereto. There are actually two hammer lugs and two chain shackles located 180° opposite each other on opposite sides of outer sleeve 36. The chain shackle is used to connect a line to outer sleeve 36 to exert a pulling force on outer sleeve 36 and the hammer lug 58 is used to allow an impacting force to be transmitted to the outer sleeve 36 so as to provide the necessary upward or downward force to move outer sleeve 36 between its open and closed positions. Hammer lug 58 and chain shackle 60 may each be referred to as a force transfer means.

When it is desired to disconnect the coupling 14 from the casing collar 16, the latch means 40 are unlatched and the outer sleeve 36 is moved downward from its closed position shown in FIG. 5 to its open position shown in FIG. 3. This is typically done by hammering downward on the hammer lugs 58.

The coupling 14 includes a release means 62 operably associated with the collet sections 28 and the outer sleeve 36, for moving the lower ends 32 of collet sections 28 out of engagement with lower end 34 of casing collar 16 upon sliding of outer sleeve 36 from its upper closed position to its lower open position.

Release means 62 includes a radially outer downwardly tapered fourth cam surface 64 on outer sleeve 36. Fourth cam surface may be referred to as releasing cam surface 64.

Release means 62 further includes a plurality of cam follower members 66, one of said cam follower members 66 being attached to a lower portion of each collet section 28 and having a follower surface 68 defined thereon for engagement with fourth cam surface 64.

The fourth cam surface 64 and the cam follower members 66 are so arranged and constructed that movement of sleeve 36 from its closed position illustrated in FIG. 5 downward to its open position illustrated in FIG. 3 moves fourth cam surface 64 into engagement with follower surfaces 68 and thereby cams said lower ends of collet sections 28 radially outward away from casing collar 16 and well casing 12.

Each of the cam follower members 66 includes a shank 70 attached to said lower end of one of the collet sections 28 and extending radially outward from the collet sections 28 through one of a plurality of longitudinal slots 72 disposed in sleeve 36. Slots 72 extend from below releasing cam surface 64 upward into releasing cam surface 64. Each follower member 66 also includes a head 74 on a radially outer end of shank 70, said head 74 being wider than a width of slot 72 and said cam follower surface 68 being defined on a radially inner end of head 74.

The body member 20 includes an annular downwardly open seal groove 76 arranged to oppose the upper end 26 of casing collar 16 when body member 20 is coupled to casing collar 16. The seal means 24 is disposed in seal groove 76.

The annular seal means 24 includes an elastomeric sealing portion 78 and an anti-extrusion ring means 82 for preventing extrusion of the elastomeric sealing portion 78 from seal groove 76 past a radially outer edge 80 of upper end 26 of casing collar 16. This anti-extrusion ring means is necessary due to the high pressures within casing 12 which otherwise may cause the elastomeric sealing portion 78 to be extruded through any space communicated with a low pressure area.

Figure 6:
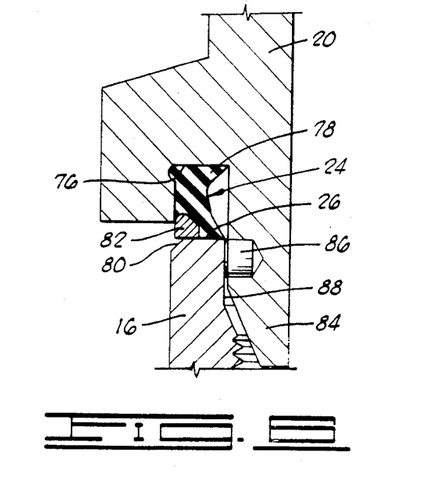
FIG. 6 is an enlarged view of the annular seal means located between the body member and the upper end of the casing collar, showing the compression of the annular seal means for a minimum length of the casing collar within allowable tolerances for the casing collar.
Figure 7:
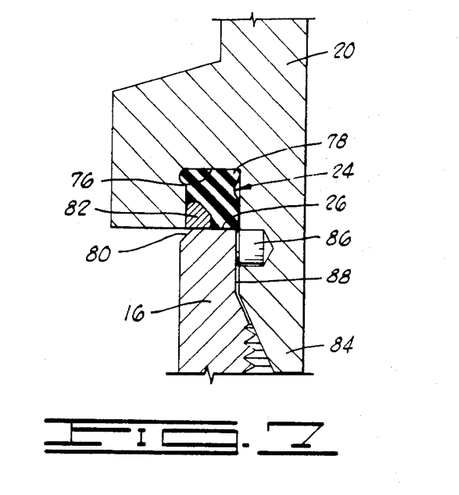
FIG. 7 is a view similar to FIG. 6 for a maximum allowable length of the casing collar within allowable tolerances for the length of the casing collar.

As may best be understood with reference to FIGS. 6 and 7, the seal means 24 is designed to provide a satisfactory seal for any length of casing collar 16 within a range of acceptable tolerances for said casing collar 16. FIG. 6 is a view of seal 24 in the compressed state for a minimum length of casing collar 16 within the allowable range of lengths for casing collar 16.

FIG. 7 similarly illustrates the compressed state of seal 24 when casing collar 16 has a length which is the maximum permissible length within the range of tolerances for that length.

Generally, the seal 24 is so arranged and constructed that the elastomeric sealing portion 78 is sealingly compressed between the body member 20 and the upper end 26 of casing collar 16 when the sleeve 36 is in its closed position as illustrated in FIG. 5, for any longitudinal length of casing collar 16 within a range of acceptable lengths. It can be seen in FIGS. 6 and 7 that the anti-extrusion ring 82 covers any possible gap between body member 20 and the upper end 26 of casing collar 16 for any length of casing collar 16 within its allowable tolerances.

Figure 10:
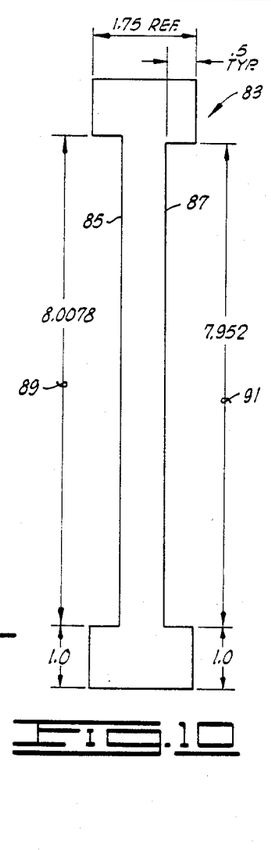
FIG. 10 is a front elevation view of a gauge for measuring the length of casing collars.
Figure 11:
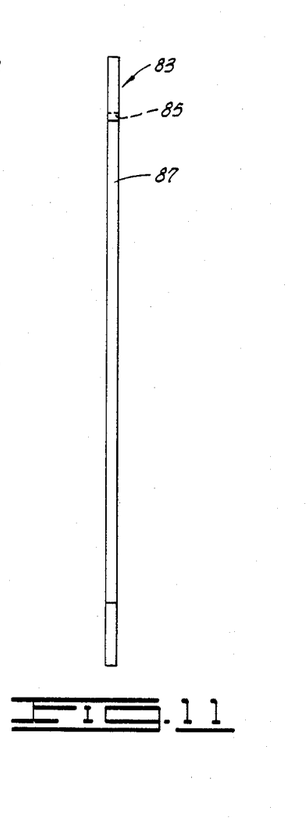
FIG. 11 is a side elevation view of the gauge of FIG. 10.

FIGS. 10 and 11 are front and side elevation views, respectively, of a go-no go gauge 83. Gauge 83 is constructed from flat steel plate and includes first and second cut-outs 85 and 87 of lengths 89 and 91, respectively.

Length 89 defines the maximum allowable length of a casing collar 16 to be used with coupling 14, i.e., the collar 16 must "go" into cut-out 85. Length 91 defines the minimum allowable length of casing collar 16, i.e., the collar 16 must "not go" into cut-out 87.

Thus gauge 83 provides a very simple means for checking casing collars 16 in the field to be sure that any collar used with coupling 14 is within the range of acceptable lengths defined between lengths 91 and 89.

The body member 20 includes a downwardly extending cylindrical portion 84 which is closely received within the open upper end of casing collar 16. Body member 20 further includes a plurality of centering means 86 extending radially outward from cylindrical portion 84 for engaging a cylindrical inner surface 88 of casing collar 16 and for thereby centering cyylindrical portion 84 of body member 20 within casing collar 16 and thereby aligning the seal means 24 longitudinally opposite the upper end surface 26 of casing collar 16. Centering means 86 are preferably nylon buttons.

Referring again to the construction of body member 20, the body member 20 may generally be described as having a radially outer surface 90 having an annular collet receiving groove 92 therein. The coupling surface 50 of body member 20 is the lower surface of collet receiving groove 92 and is upwardly tapered at an angle substantially equal to an angle of the upward taper of lug cam surfaces 48.

The body member 20 further includes a collet retaining ring 94 which is detachably attached to a main portion of body member 20 by means of a plurality of keys 96 and set screws 98. Retaining ring 94 includes a downwardly extending skirt 100 located radially outward from upper ends of collet sections 28 for retaining the lugs 31 in collet receiving groove 92. Ring 94 includes a latch groove 102 which is engaged by a hook of latch means 40.

Figure 8:
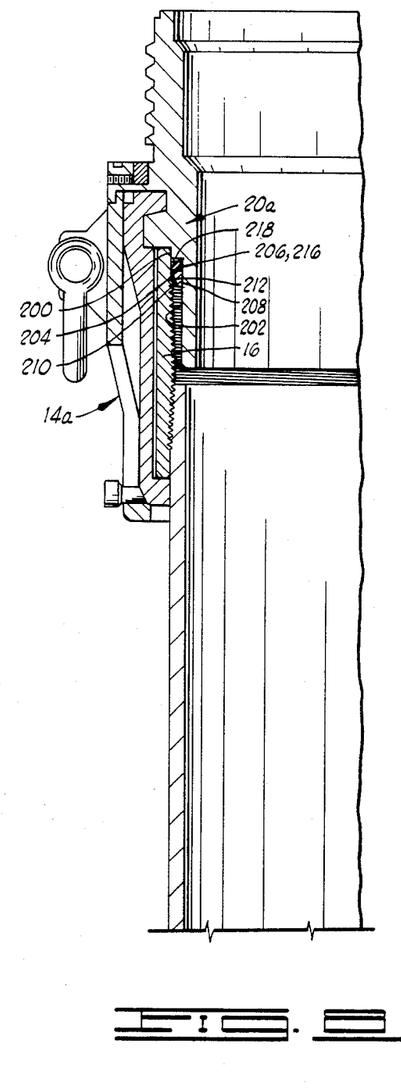
FIG. 8 is a view similar to FIG. 5 showing an alternative embodiment of the present invention, having a modified seal means.
Figure 9:
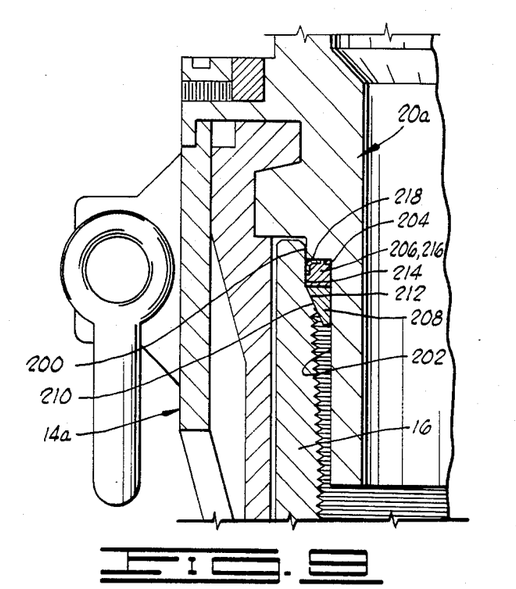
FIG. 9 is an enlarged view of the portion of FIG. 8 surrounding the annular seal means.

Alternate Embodiment of FIGS. 8 and 9

FIG. 8 is a view similar to FIG. 5, showing an alternate form of annular seal. FIG. 9 is an enlarged view of a portion of FIG. 8.

The coupling of FIG. 8 is designated as 14a. Components like those of coupling 14 of FIG. 5 carry the same numerals. Modified components are indicated by a suffix "a".

Coupling 14a includes a body member 20a having a downward extending first cylindrical portion 200 received in the open upper end of casing collar 16.

A further downward extending second cylindrical portion 202 has a reduced diameter and is joined to first cylindrical portion 200 by a surface 204.

An annular seal means 206 is disposed about second cylindrical portion 202 and engages surface 204.

An annular sliding seal support ring means 208 is disposed about second cylindrical portion 202 below and engaging seal means 206. Seal support ring means 208 has a radially outer downwardly tapered surface 210 which engages a beveled surface 212 of casing collar 16.

When sleeve 36 is moved upward and body member 20a is cammed downward toward casing collar 16, the seal means 206 is compressed between annular surface 204 and support ring 208, thus causing seal means 206 to seal against a cylindrical inner surface 214 of casing collar 16.

Seal means 206 includes an elastomeric sealing portion 216 and an anti-extrusion ring means 218. Anti-extrusion ring 218 prevents extrusion of elastomeric portion 216 between first cylindrical portion 200 of body member 20a and inner cylindrical surface 214 of casing collar 16.

Thus it is seen that the quick connect coupler of the present invention readily achieves the ends and advantages mentioned as well as those inherent therein. While certain preferred embodiments of the present invention have been illustrated for the purposes of this disclosure, numerous changes in the arrangement and construction of parts may be made by those skilled in the art, which changes are encompassed within the scope and spirit of this invention as defined by the appended claims.

What is claimed is:

1. A coupling to connect a first member to an end portion of a cylindrical member, the end portion having a radially outward extending shoulder having a longitudinal inward facing surface, said coupling comprising:
   a body member disposable about a portion of the end portion of said cylindrical member and adapted to have said first member connected thereto, said body member having a radially outer surface having, in turn, an annular collet receiving groove therein;
   annular seal means for sealing between said body member and said cylindrical member;
   a plurality of collet sections disposed around said body member, each of said collet sections having a first end adapted to be releasably connectable to the annular collet receiving groove in the radially outer surface in said body member and a second end adapted to be releasably engageable with a longitudinally inward facing surface of said shoulder of said cylindrical member;
   an outer sleeve slidably disposed about said plurality of collet sections, said sleeve being slidable relative to said collet sections between an open position wherein said second ends of said collet sections may receive said shoulder of said cylindrical member therebetween and said first ends of said collet sections may receive therebetween the radially outer surface having an annular collet receiving groove therein of said body member and a closed position wherein said body member is sealingly coupled to said cylindrical member by said seal means and said second ends of said collet sections releasably engaging the longitudinally inward facing surface of said shoulder of said cylindrical member while said first ends of said collet sections releasably engage the annular collet receiving groove in the radially outer surface of said body member; and
   release means, operably associated with said plurality of collet sections and said outer sleeve, for moving said second ends of said collet sections out of engagement with said shoulder of said cylindrical member and for moving said first ends of said collet sections out of engagement with the annular collet receiving groove in the radially outer surface of said body member upon sliding of said outer sleeve from its closed position to its open position, said release means comprising:
   a radially outer tapered cam surface on said outer sleeve;
   a radially inner tapered first cam surface on said outer sleeve;
   a plurality of radially outer tapered second cam surfaces, each radially outer tapered second cam surface of said plurality of radially outer tapered second cam surfaces being located on a collet section of said plurality of collet sections; and
   a plurality of cam follower members, each cam follower member of said plurality of cam follower members being attached to said second end of each collet section of said plurality of collet sections and having a follower surface thereon engaging said radially outer tapered cam surface on said outer sleeve whereby said radially inner tapered first cam surface on said outer sleeve being arranged and constructed relative to said plurality of collet sections that upon movement of said sleeve from its said open position toward its said closed position said radially inner tapered first cam surface on said outer sleeve engages said second ends of said plurality of collet sections and cams said second ends of said plurality of collet sections radially inward toward said cylindrical member to engage with the longitudinally inward facing surface of said shoulder of said cylindrical member, said radially outer tapered second cam surfaces being arranged and constructed relative to said outer sleeve that upon movement of said outer sleeve from its said open position toward its said closed position said sleeve engages said radially outer tapered second cam surfaces of said plurality of, collet sections and cams said first ends of said plurality of collet sections radially inward toward said body member for said first ends of said plurality of collet sections to engage the annular collet receiving groove in the radially outer surface of said body member, and said radially outer tapered cam surface on said outer sleeve and said cam follower members being arranged and constructed that movement of said sleeve from its closed position to its open position moves said radially outer tapered cam surface into engagement with said follower surfaces of said plurality of collet sections and thereby cams said second ends of said plurality of collet sections radially outward away from engagement with the longitudinally inward facing surface of said shoulder of said cylindrical member.

2. The coupling of claim 1, wherein:
each of said cam follower members includes a shank attached to said second end of one of said collet sections and extending radially outward from said one collet section through a longitudinal slot disposed in said sleeve, and also includes a head on a radially outer end of said shank, said head being wider than a width of said slot, and said cam follower surface being defined on a radially inner end of said head.

3. The coupling of claim 1, wherein said actuating means further comprises:
a plurality of radially inner tapered third cam surfaces, a third cam surface of said plurality of third cam surfaces being on each said first ends of said collet section of said plurality of collet sections and engaging said body member, said third cam surfaces being arranged and constructed relative to said body member and said sleeve that upon radially inward movement of said first ends of said plurality of collet sections due to movement of said sleeve from its open position toward its closed position said plurality of collet sections are first cammed longitudinally outward relative to said cylindrical member until said second ends of said plurality of collet sections engage said longitudinally inward facing surface of said shoulder of said cylindrical member, and then said body member is cammed longitudinally inward toward said cylindrical member thereby compressing said seal means; and
a radially inner cylindrical locking surface on said sleeve for closely receiving radially outer arcuate surfaces of said first ends of said plurality of collet sections upon movement of said sleeve to its said closed position, said cylindrical locking surface of said sleeve being located longitudinally outward from said radially inner tapered first cam surface, and said arcuate surfaces of said first ends of said plurality of collet sections being located longitudinally outward from said radially outer tapered second cam surfaces of said plurality of collet sections.

4. The coupling of claim 1, wherein:
said body member includes an annular longitudinally inwardly open seal groove arranged to oppose a longitudinally outward facing annular surface of said shoulder of said cylindrical member when said body member is coupled with said cylindrical member;
said annular seal means is disposed in said seal groove of said body member; and
said annular seal means includes an elastomeric sealing portion and an anti-extrusion ring means for preventing extrusion of said elastomeric sealing portion from said seal groove past a radially outer edge of said longitudinally outward facing annular surface of said shoulder of said cylindrical member.

5. The coupling of claim 4, wherein:
said elastomeric sealing portion of said seal means is so arranged and constructed that it is sealingly compressed between said body member and said longitudinally outward facing annular surface of said shoulder of said cylindrical member when said outer sleeve is in its said closed position for a selected longitudinal length of said shoulder within a range of possible lengths, said longitudinal length of said shoulder being defined as a longitudinal distance between said longitudinally outward and inward facing surfaces of said shoulder.

6. The coupling of claim 4, wherein:
said body member includes a longitudinally inward extending cylindrical portion arranged and constructed to be closely received within an open longitudinally outward end of said shoulder; and
said body member further includes a plurality of centering means, extending radially outward from said cylindrical portion of said body member, for engaging a cylindrical inner surface of said cylindrical member and for centering said cylindrical portion of said body member therein and thereby aligning said seal means longitudinally opposite said longitudinally outward facing annular surface of said shoulder.

7. The coupling of claim 1, wherein:
said seal means includes an elastomeric portion and anti-extrusion means for preventing extrusion of an elastomeric portion of said seal means upon compression of said seal means between said body member and said cylindrical member.

8. The coupling of claim 1, wherein:
said body member includes a longitudinally inward extending first cylindrical portion arranged and constructed to be closely received within an inner cylindrical surface of an open longitudinally outward end of said cylindrical member, and said body member includes a further longitudinally inward extending reduced diameter second cylindrical portion, said first and second cylindrical portions being joined by an annular longitudinally inward facing surface of said body member;

said annular seal means is disposed about said reduced diameter second cylindrical portion and engages said annular longitudinally inward facing surface of said body member; and said coupling further includes an annular sliding seal support ring means, disposed about said reduced diameter second cylindrical portion longitudinally inward from said annular seal means and engaging said annular seal means, for engaging said cylindrical member when said outer sleeve is moved to its closed position and for compressing said annular seal means longitudinally so that said annular seal means seals radially against said inner cylindrical surface of said open longitudinally outward end of said cylindrical member.

9. The coupling of claim 8, wherein:

said annular seal means includes an elastomeric sealing portion and an anti-extrusion ring means for preventing extrusion of said elastomeric sealing portion between said longitudinally inward extending first cylindrical portion of said body member and said inner cylindrical surface of said open longitudinally outward end of said cylindrical member.

10. A coupling to connect to a well casing, said well casing including a casing collar attached to an upper end thereof, said casing collar having a lower end, said coupling comprising:
  (a) a body member including:
    (1) a main portion having a radially outer surface having, in turn, an annular collet receiving groove therein, the lower surface of said collet receiving groove being upwardly tapered at an angle; and
    (2) a collet retaining ring releasably attached to a main portion of said body member, said collet retaining ring having a downwardly extending skirt;
  (b) an annular seal means having an elastomeric portion, disposed about said body member, for sealingly engaging said casing collar;
  (c) a plurality of collet sections disposed around said body member; each of said collet sections including:
    (1) an upper end including a radially inwardly extending lug having a radially inner upwardly tapered lug cam surface adapted to releasably engage said annular collet receiving groove of said body member, the radially inner upwardly tapered lug cam surface of the upper end of each of said collet sections being tapered at an angle substantially equal to the angle of the lower surface of said collet receiving groove;
    (2) a lower end including an upward facing surface adapted for engagement with a lower end of said casing collar; and
    (3) a radially outer downwardly tapered collet cam surface; and
  (d) an outer sleeve slidably disposed about said plurality of collet sections, said outer sleeve including:
    (1) a radially inner downwardly tapered sleeve cam surface arranged to engage said lower ends of said collet sections upon upward movement of said sleeve relative to said collet sections;
    (2) an upper end arranged to engage said radially outer downwardly tapered collet cam surfaces of said collet sections and move said collet sections inwardly upon upward movement of sleeve to a closed position relative to said collet sections; and
    (3) an annular recess in a portion of one end thereof arranged to receive a portion of the downwardly extending skirt of said collet retaining ring of said body member therein when said outer sleeve is in a closed position having moved said collet sections inwardly thereby causing by moving said collet sections inwardly the radially inner upwardly tapered lug cam surfaces on the upper ends of said plurality of collet sections to engage the annular collet receiving groove in the radially outer surface of said body member and causing the upward facing surfaces of the lower ends of said plurality of collet sections to engage the lower end of said casing collar whereby movement of said outer sleeve slidably disposed about said plurality of collet sections relative to said plurality of collet sections from an open position where the radially inner upwardly tapered lug cam surfaces on the upper ends of said plurality of collet sections do not engage the annular collet receiving groove in the radially outer surface of said body member, the upward facing surfaces of the lower ends of said plurality of collet sections do not engage the lower end of said casing collar, and the annular recess in a portion of one end of said outer sleeve does not engage the downwardly extending skirt of said collet retaining ring of said body member to a closed position where said plurality of collet sections are moved inwardly by said outer sleeve relative to said casing collar and said body member, the radially inner upwardly tapered lug cam surfaces on the upper ends of said plurality of collet sections engage the annular collet receiving groove in the radially outer surface of said body member, the upward facing surfaces of the lower ends of said plurality of collet sections engage the lower end of said casing collar, and the annular recess in a portion of one end of said outer sleeve engages the downwardly extending skirt of said collet retaining ring of said body member thereby causing said body member to be retained on said casing collar.

11. The coupling of claim 10, wherein:

each of said collet sections includes a radially outer arcuate surface located above said collet cam surface; and said outer sleeve includes an inner cylindrical locking surface, located above said sleeve cam surface, for closely receiving said arcuate surfaces of said collet sections when said sleeve is in an upwardmost position relative to said collet sections.

12. The coupling of claim 11, further comprising:

latch means for latching said outer sleeve to said body member to hold said outer sleeve in its said upwardmost position.

13. The coupling of claim 10, wherein:

said outer sleeve includes a radially outer downwardly tapered releasing cam surface, and includes a plurality of longitudinal slots disposed therein and extending from below said releasing cam surface upward into said releasing cam surface; and said coupling further comprises a plurality of releasing cam follower elements, each of said follower elements including:
  a shank having a radially inner end attached to a lower portion of one of said collet sections and extending radially outward through one of said slots; and a follower head on a radially outer end of said shank, said head being arranged to engage said releasing cam surface upon movement of said sleeve downward relative to said collet sections.

14. The coupling of claim 10, further comprising:

force transfer means, attached to said outer sleeve, for transferring upward and downward forces to said sleeve to move said sleeve relative to said collet sections.

15. The coupling of claim 10, wherein:

said body member includes an annular downwardly open seal groove arranged to oppose an upper end surface of said casing collar when said body member is coupled with said well casing;

said annular seal means is disposed in said seal groove of said body member; and said annular seal means includes an elastomeric sealing portion and an anti-extrusion ring means for preventing extrusion of said elastomeric sealing portion from said seal groove past a radially outer edge of said upper end surface of said casing collar.

16. The coupling of claim 15, wherein:

said elastomeric sealing portion of said seal means is so arranged and constructed that it is sealingly compressed between said body member and said upper end surface of said casing collar when said outer sleeve is in its said closed position for a selected length of said casing collar within a range of possible lengths, said length of said casing collar being defined as a longitudinal distance between said upper and lower end surfaces of said casing collar.

17. The coupling of claim 15, wherein:

said body member includes a downward extending cylindrical portion arranged and constructed to be closely received within an open upper end of said casing collar; and said body member further includes a plurality of centering means, extending radially outward from said cylindrical portion of said body member, for engaging a cylindrical inner surface of said casing collar and for centering said cylindrical portion of said body member therein and thereby aligning said seal means longitudinally opposite said upper end surface of said casing collar.

18. The coupling of claim 10, wherein:

said seal means includes anti-extrusion means for preventing extrusion of an elastomeric portion of said seal means upon compression of said seal means between said body member and said casing collar.

19. The coupling of claim 10, wherein:

said body member includes a downward extending first cylindrical portion arranged and constructed to be closely received in an open upper end of said casing collar, and said body member includes a further downward extending reduced diameter second cylindrical portion, said first and second cylindrical portions being joined by a downward facing surface of said body member;

said annular seal means is disposed about said reduced diameter second cylindrical portion and engages said downward facing surface of said body member; and said coupling further includes an annular sliding seal support ring means, disposed about said reduced diameter second cylindrical portion below said annular seal means, for engaging a radially inner downward tapered surface of said casing collar when said outer sleeve is moved upwardly relative to said collet sections and for compressing said annular seal means longitudinally so that said annular seal means seals radially against an inner cylindrical surface of said casing collar.

20. The coupling of claim 19, wherein:

said annular seal means includes an elastomeric sealing portion and an anti-extrusion ring means for preventing extrusion of said elastomeric sealing portion between said downward extending first cylindrical portion of said body member and said inner cylindrical surface of said casing collar.

* * * * *

UNITED STATES PATENT AND TRADEMARK OFFICE
CERTIFICATE OF CORRECTION

PATENT NO. : 4,522,430

DATED : June 11, 1985

INVENTOR(S) : James L. Stromberg

It is certified that error appears in the above-identified patent and that said Letters Patent is hereby corrected as shown below:

In column 7, line 5, delete the word [cyylindrical] and insert therefor --cylindrical--.

In column 8, lines 6 and 7, delete the word [longitudinal] and insert therefor --longitudinally--.

Signed and Sealed this

Eighth Day of October 1985

[SEAL]

Attest:

Attesting Officer

DONALD J. QUIGG

Commissioner of Patents and Trademarks—Designate